United States Patent
Umehara

(10) Patent No.: US 11,722,047 B2
(45) Date of Patent: Aug. 8, 2023

(54) VOLTAGE CONVERTER

(71) Applicant: TOYOTA JIDOSHA KABUSHIKI KAISHA, Toyota (JP)

(72) Inventor: Takahiro Umehara, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 15 days.

(21) Appl. No.: 17/648,017

(22) Filed: Jan. 14, 2022

(65) Prior Publication Data

US 2022/0231590 A1 Jul. 21, 2022

(30) Foreign Application Priority Data

Jan. 20, 2021 (JP) ................................ 2021-007021

(51) Int. Cl.
*H02M 3/158* (2006.01)
*H02M 1/00* (2006.01)
*H02M 3/156* (2006.01)

(52) U.S. Cl.
CPC ......... *H02M 1/0009* (2021.05); *H02M 3/156* (2013.01); *H02M 3/1584* (2013.01)

(58) Field of Classification Search
CPC .. H02M 3/158; H02M 3/1584; H02M 3/1586; H02M 1/0009
See application file for complete search history.

(56) References Cited

U.S. PATENT DOCUMENTS

| | | | |
|---|---|---|---|
| 2011/0096576 A1* | 4/2011 | Takahashi | H02M 1/4225 363/44 |
| 2012/0014148 A1* | 1/2012 | Li | H02M 1/4216 363/78 |
| 2016/0020692 A1* | 1/2016 | Castelli | H02M 1/4208 323/205 |
| 2017/0093301 A1* | 3/2017 | Nakano | H02M 1/4225 |
| 2020/0067403 A1* | 2/2020 | Ohtake | H02M 3/157 |
| 2021/0408913 A1* | 12/2021 | Yanagida | H02M 1/0025 |
| 2022/0060107 A1* | 2/2022 | Yaginuma | H02M 3/156 |

FOREIGN PATENT DOCUMENTS

| | | |
|---|---|---|
| JP | 2002216986 A | 8/2002 |
| JP | 2015162939 A | 9/2015 |

* cited by examiner

*Primary Examiner* — Alex Torres-Rivera
(74) *Attorney, Agent, or Firm* — Dickinson Wright, PLLC

(57) ABSTRACT

To provide a voltage converter configured to suppress individual variation in voltage conversion ratio and configured to achieve a high voltage conversion ratio. A voltage converter comprising a reactor, a switching element, a diode, a current sensor, and a controller, wherein the controller detects a current value of the reactor several times in a switching period; wherein the controller calculates an estimated execution ON time length from a transition of a current value of the reactor detected in the switching period; wherein the controller calculates a difference between the estimated execution ON time length and a command ON time length instructed by the controller; and wherein, by using the difference, the controller corrects the command ON time length of the time when performing any of subsequent ON commands in a range not exceeding a predetermined command ON time upper limit value.

2 Claims, 2 Drawing Sheets

VOLTAGE CONVERTER

TECHNICAL FIELD

The present disclosure relates to a voltage converter.

BACKGROUND

Various studies have been made on the converter provided in a system installed and used in a vehicle such as a fuel cell electric vehicle. In a DC/DC converter used in various electronic devices and the like, a circuit composed of a reactor, a switching element, a diode, a capacitor and so on are used often. Increasing and decreasing of current flowing through the reactor are controlled by ON/OFF signals from a switch.

For example, the following technique is disclosed in Patent Literature 1: to provide a DC/DC converter that is capable of maintaining a function to protect a current detecting circuit from excessive current even if the circuit has a problem, the upper limit of the duty ratio (command ON time) of switching is set based on a delay in the time of detection of the current flowing through the reactor of the DC/DC converter, and the switching is controlled not to exceed the upper limit of the duty ratio.

In Patent Literature 2, a discharge lamp lighting device is disclosed, which can easily reduce the noise generated during continuous-mode operation such as when starting, as well as improving the efficiency at the time of steady-state lighting.

Patent Literature 1: Japanese Patent Application Laid-Open (JP-A) No. 2015-162939
Patent Literature 2: JP-A No. 2002-216986

Since a step-up operation is performed by repetition of ON/OFF of the switching, the upper limit of the command ON time is set so that the OFF time does not become zero. Meanwhile, it is known that with respect to the length of the command ON time of the switching, the length of the execution ON time varies by variation and time-dependent deterioration in the components of the converter. The technique of Patent Literature 1 is to set the command ON time so that the OFF time does not become zero, by considering the variation and time-dependent deterioration in the components and based on an individual that the expected execution ON time becomes the longest with respect to the command ON time. In the technique of Patent Literature 1, if the same upper limit of the command ON time is set on an individual that the execution ON time is shorter, there is a possibility that a sufficient ON time is not be obtained, and an expected voltage-conversion ratio is be obtained.

SUMMARY

An object of the present disclosure is to provide a voltage converter configured to suppress individual variation in voltage conversion ratio and configured to achieve a high voltage conversion ratio.

In a first embodiment, there is provided a voltage converter comprising a reactor, a switching element, a diode, a current sensor, and a converter,
wherein the current sensor obtains a value of current flowing through the reactor;
wherein the controller performs ON-OFF control of the switching element by switching ON and OFF commands to the switching element;
wherein the controller detects a current value of the reactor several times in the switching period;
wherein the controller calculates an estimated execution ON time length from a transition of a current value of the reactor detected in the switching period;
wherein the controller calculates a difference between the estimated execution ON time length and a command ON time length instructed by the controller; and
wherein, by using the difference, the controller corrects the command ON time length of the time when performing any of subsequent ON commands in a range not exceeding a predetermined command ON time upper limit value.

By using the difference, the controller may correct the command ON time length of the time when performing the next ON command in the range not exceeding the predetermined command ON time upper limit.

According to the voltage converter of the disclosed embodiments, individual variation in voltage conversion ratio can be suppressed, and a high voltage conversion ratio can be achieved.

BRIEF DESCRIPTION OF THE DRAWINGS

In the accompanying drawings.

DETAILED DESCRIPTION

The voltage converter of the disclosed embodiments is a voltage converter comprising a reactor, a switching element, a diode, a current sensor, and a controller,
wherein the current sensor obtains the value of current flowing through the reactor;
wherein the controller performs ON-OFF control of the switching element by switching ON and OFF commands to the switching element;
wherein the controller detects the current value of the reactor several times in the switching period;
wherein the controller calculates the estimated execution ON time length from the transition of the current value of the reactor detected in the switching period;
wherein the controller calculates a difference between the estimated execution ON time length and the command ON time length instructed by the controller; and
wherein, by using the difference, the controller corrects the command ON time length of the time when performing any of subsequent ON commands in a range not exceeding the predetermined command ON time upper limit value.

In the present disclosure, the performed ON time is estimated using the multipoint sample obtained by monitoring the transition of the value of the current flowing through the reactor. Then, the command ON time is appropriately corrected by using the difference between the estimated ON time and the command ON time. Accordingly, the upper limit of the execution ON time can be constant regardless of individual variation in circuit components such as a photocoupler and a capacitor. As a result, individual variation in voltage conversion ratio can be suppressed, and a high voltage conversion ratio can be achieved.

Figure 1:
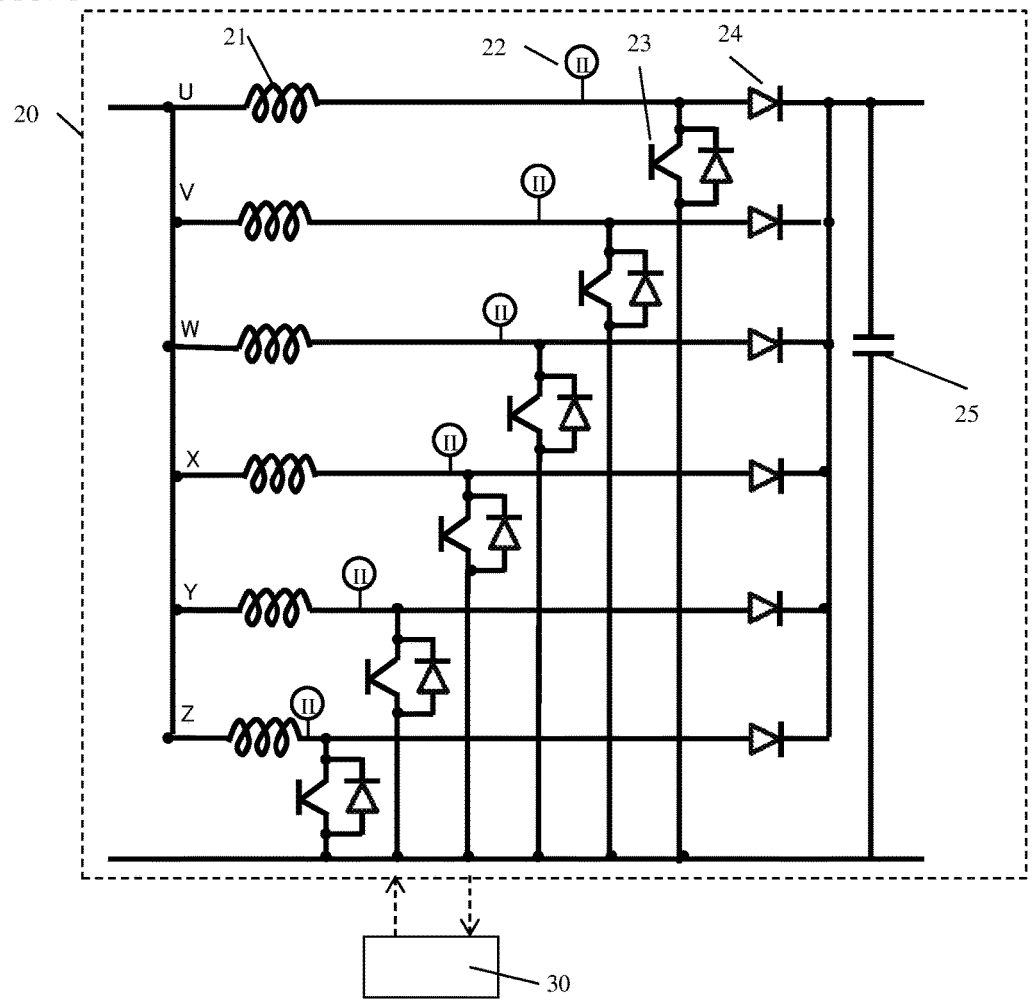
FIG. 1 is a diagram showing an example of the configuration of the step-up circuit of the step-up converter.

FIG. 1 is a diagram showing an example of the configuration of the step-up circuit of the step-up converter.

The left side of FIG. 1 is connected to the power supply, and the right side of FIG. 1 is connected to the load. As the power source, examples include, but are not limited to, a fuel cell. The fuel cell may be a single unit cell, or it may be a fuel cell stack composed of stacked unit cells. As the load, examples include, but are not limited to, a motor via an inverter.

A step-up converter 20 includes six step-up circuits that are connected in parallel to each other. Each two of the six step-up circuits may be magnetically coupled to each other. FIG. 1 shows a configuration including six step-up circuit phases; however, the number of the phases is not particularly limited.

Each step-up circuit includes a reactor 21, a current sensor 22, a switching element 23, a diode 24, and a capacitor 25. In each step-up circuit, the current flowing through the reactor 21 is increased by turning the switching element 23 ON; the current flowing through the reactor 21 is reduced by turning the switching element 23 OFF; and when the current reaches zero, the current is kept zero. The current sensor 22 obtains the value of the current flowing through the reactor 21.

A controller 30 controls the step-up ratio in the converter 20 and the value of the output current from the power supply by controlling ON/OFF of the switching element 23.

The voltage converter performs at least one of step-up and step-down of the output voltage of the power supply. The converter may be a step-up converter, a step-down converter, or a step-up/down converter.

The voltage converter includes a reactor, a switching element, a diode, a current sensor, and a controller. As needed, it may include a photocoupler, a capacitor and so on.

The reactor includes a coil and a core.

One or more coils may be wound around the core.

The core and coil of the reactor may be employed from cores and coils used in conventionally-known converters.

The switching element may be an IGBT, a MOSFET, or the like.

The diode may be employed from diodes used in conventionally-known converters

The current sensor is not particularly limited, as long as it can obtain the value of the current flowing through the reactor (the reactor current). As the current sensor, a conventionally-known current meter or the like may be used.

The controller may be an electronic control unit or the like. The ECU includes a central processing unit (CPU), a memory, and an input/output buffer.

By periodically switching the ON and OFF commands to the switching element, the controller performs ON-OFF control of the switching element. The value of the output current from the power supply may be controlled thereby.

The controller detects the value of the current flowing through the reactor several times in the switching period.

The controller may detect the value of the current flowing through the reactor by a signal from the current sensor.

In the disclosed embodiments, the period of the switching (switching period) means a period from the time when the switching element is switched from OFF to ON until the time when the switching element is switched from OFF to ON again.

The number of the reactor current values detected in the switching period may be at least two. It may be appropriately set according to the method for estimating the execution ON time length.

[Estimation of the Execution ON Time Length]

The controller calculates the estimated execution ON time length from the transition of the current value of the reactor detected in the switching period.

As the method for estimating the execution ON time length, examples include, but are not limited to, the following methods.

(Example 1): The controller may execute multi-point sampling of the reactor current value during the ON time of the switching period and then may estimate the execution ON time length from the difference A between the minimum reactor current value and the maximum reactor current value during the ON time. In this case, the reactor current value may be sampled at least at two points during the ON time of the switching period.

(Example 2): The controller may estimate the execution ON time length from the intersection of the gradient of the reactor current during the ON time and the gradient of the reactor current during the OFF time, both of which are obtained by multi-point sampling of the reactor current value during the ON and OFF times in the switching period. In this case, the reactor current value may be sampled at least at two points during the ON time of the switching period, and the reactor current value may be sampled at least at two points during the OFF time of the switching period.

In the case where the converter is a magnetically coupled converter, the execution ON time length may be estimated in each circuit by the method described above in (Example 1) or (Example 2).

In the disclosed embodiments, a reactor including a core and one independent coil wound on the core, is referred to as a non-magnetically coupled reactor; a converter including a non-magnetically coupled reactor is referred to as a non-magnetically coupled converter; a reactor including a core and two or more independent coils wound on the core, is referred to as a magnetically coupled reactor; and a converter including a magnetically coupled reactor is referred to as a magnetically coupled converter.

In the disclosed embodiments, the independent coil means a coil including one or more windings and two terminals.

The controller calculates the difference between the estimated execution ON time length and the command ON time length instructed by the controller.

[Correction of the Command ON Time]

By using the difference, the controller corrects the command ON time length of the time when performing any of subsequent ON commands in the range not exceeding the predetermined command ON time upper limit value.

The command ON time length to be corrected may be the command ON time length of the time when performing any of subsequent ON commands. From the viewpoint of better power conversion accuracy, the command ON time length to be corrected may be the command ON time length of the time when performing the next ON command.

The predetermined command ON time upper limit value is not particularly limited, as long as the duty ratio does not become 100%. For example, the predetermined command ON time upper limit value may be a value at which the duty ratio becomes 99.9%. The duty ratio (%) may be expressed by the following equation.

$$\text{Duty ratio (\%)} = \{\text{Command ON time}/(\text{Command ON time} + \text{Command OFF time})\} \times 100$$

The method for correcting the command ON time may be, for example, the following method based on the difference between the command ON time and the estimated execution ON time.

If the estimated execution ON time is longer than the command ON time, the estimated execution OFF time is shorter than the command OFF time. In this case, the command ON time length may be corrected so as not to reach a duty ratio of 100% and cause a short circuit, so as not to exceed the predetermined command ON time upper limit, and so as to decrease the command ON time length If the command ON time length exceeds the predetermined command ON time upper limit by the correction using the difference, it is not needed to correct the command ON time. If the command ON time length exceeds the predetermined command ON time upper limit value by the correction using the difference, the command ON time length may be corrected to the predetermined command ON time upper limit value.

If the estimated execution ON time is shorter than the command ON time, the estimated execution OFF time is longer than the command OFF time. In this case, a desired power conversion ratio cannot be obtained since the executed ON time is short. Accordingly, the command ON time length may be corrected so as to obtain the desired power conversion ratio, so as not to exceed the predetermined command ON time upper limit, and so as to increase the command ON time length.

Figure 2:
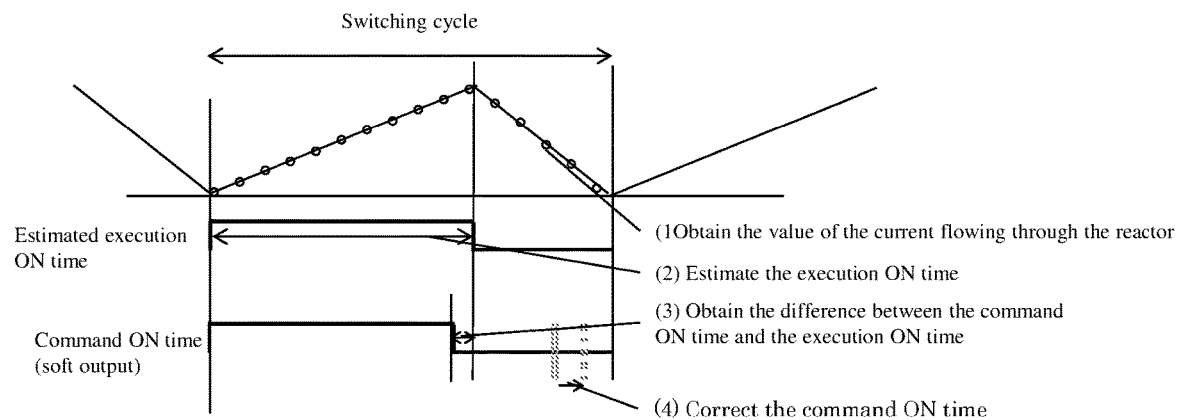
FIG. 2 is a diagram showing the time chart of the command to switch ON/OFF of the switching element, the actual timing, and the reactor current value.

FIG. 2 is a diagram showing the time chart of the command to switch ON/OFF of the switching element, the actual timing, and the reactor current value.

Figure 3:
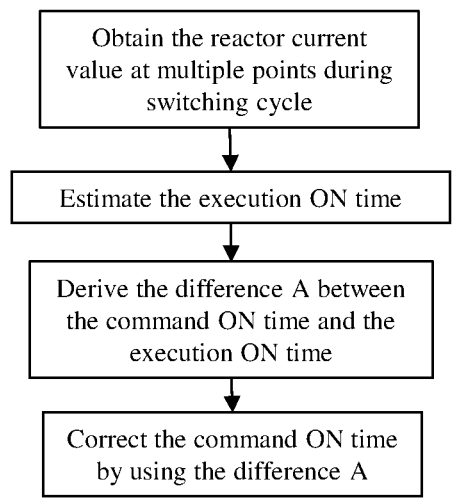
FIG. 3 is a flowchart showing the flow from multi-point sampling of the reactor current value to the correction of the command ON time length.

FIG. 3 is a flowchart showing the flow from multi-point sampling of the reactor current value to the correction of the command ON time length.

Due to variation in components (such as a capacitor and a photocoupler) disposed in a transmission path, in each individual, a large or small signal delay amount is produced between the operation of inputting a signal to switch the switch between ON and OFF and the actual switching operation.

Conventionally, in consideration of the magnitude of the signal delay amount due to the variation in the components, the upper limit value of the command ON time, that is, the upper limit value of the duty ratio is determined so that the execution OFF time does not become 0 in the worst cases.

In the disclosed embodiments, multi-point sampling of the reactor current value is executed in the switching period; the actual execution ON time length is estimated based on the values thus obtained; the difference A between the command ON time and the execution ON time is derived; and the command ON time length is corrected by using the difference A.

REFERENCE SIGNS LIST

20: Step-up converter
21: Reactor
22: Current sensor
23: Switching element
24: Diode
25: Capacitor
30: Controller

The invention claimed is:

1. A voltage converter comprising a reactor, a switching element, a diode, a current sensor, and a controller,
   wherein the current sensor obtains a value of current flowing through the reactor,
   wherein the controller performs ON-OFF control of the switching element by switching ON and OFF commands to the switching element;
   wherein the controller detects a current value of the reactor several times in a switching period;
   wherein the controller calculates an estimated execution ON time length from a transition of a current value of the reactor detected in the switching period;
   wherein the controller calculates a difference between the estimated execution ON time length and a command ON time length instructed by the controller; and
   wherein, by using the difference, the controller corrects the command ON time length of the time when performing any of subsequent ON commands in a range not exceeding a predetermined command ON time upper limit value.

2. The voltage converter according to claim 1, wherein, by using the difference, the controller corrects the command ON time length of the time when performing the next ON command in the range not exceeding the predetermined command ON time upper limit.

* * * * *